S. E. SCHROEDER & C. W. BIRD.
GEARING.
APPLICATION FILED OCT. 14, 1916.
1,295,217.
Patented Feb. 25, 1919.
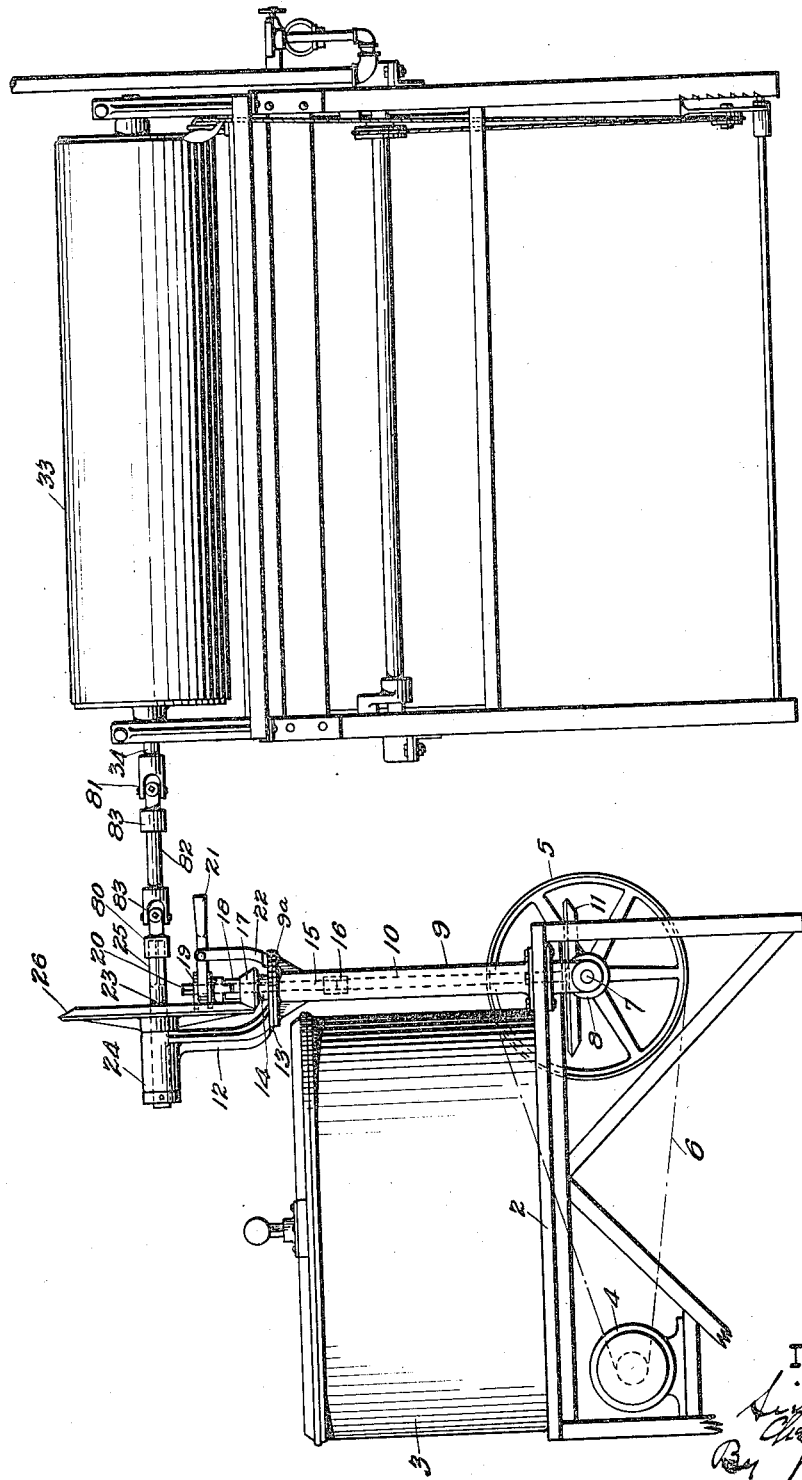

UNITED STATES PATENT OFFICE.

SIMON E. SCHROEDER AND CHARLES W. BIRD, OF MINIER, ILLINOIS.

GEARING.

1,295,217.  Specification of Letters Patent.  Patented Feb. 25, 1919.

Application filed October 14, 1916. Serial No. 125,537.

*To all whom it may concern:*

Be it known that we, SIMON E. SCHROEDER and CHARLES W. BIRD, citizens of the United States, residing at Minier, in the county of Tazewell and State of Illinois, have invented certain new and useful Improvements in Gearing, of which the following is a specification.

Our invention relates to gearing.

Our invention has special reference to driving and operating gearing between a washing machine and a mechanism and to detailed structures relating to the manipulation of the same.

The object of our invention is to so correlate the driving of a washing machine element with driving members of an ironing machine, that they may be operated simultaneously or disconnected relatively at the will of the operator and when simultaneously driven that the operation of parts will be properly timed to bring about the proper speeds necessary to carry out the work of each machine respectively.

Our invention consists of driving connections for a washing machine to effect the normal purposes and uses of such machine; the provision of a detachable gear mechanism especially designed to drive an ironing machine; of a universal joint connection between the special gear between the detachable gear mechanism and the operating mechanism and details relating to such driving connections.

Our invention also includes detailed parts and combinations hereinafter more particularly set out.

Referring to the drawings, the single figure shows in elevation, a washing machine and an operating mechanism connected for combined action.

Referring to the drawings, 2 refers generally to a platform structure; 3 is a tub or container adapted to receive clothes to be washed; 4 refers generally to a motor; 5 is a belt wheel; 6 is a belt connecting a driving member of the motor with belt wheel 5; 7 is a shaft suitably supported in connection with the platform support 2; 8 is a gear member on shaft 7; 9 is a vertically disposed hollow standard fixed upon the platform and is provided with flanged member 9ª at its upper end; 10 is a shaft suitably supported in said standard; 11 is a gear wheel fixed to shaft 10 and meshing with gear 8; 12 is a cast frame member designed to support gearing and is provided with a flanged member 13 adapted to be seated upon flanged member 9ª of standard 9; 14 is a collar united with and projecting upwardly from the face of flange 13; 15 is a shaft suitably supported in collar member 14; 16 is a collar supported in standard 9 which in practice is designed to be provided with an angular opening adapting it for connection with corresponding angularly formed ends of shafts 9 and 15 respectively; 17 is a gear member normally loose on shaft 15 provided with clutch member 18; 19 is a clutch member longitudinally adjustable on squared end 20 of shaft 15; 21 is a lever pivotally supported on bracket member 22 and is connected in the usual way with clutch member 19 to facilitate the shifting of said clutch member.

23 is a shaft suitably supported for turning in sleeve member 24 of cast frame member 12 and provided with squared end 25. 26 is a gear wheel fixed to shaft 23.

The cast frame member 12 is adapted, when desired, to be seated in connection with standard 9 to establish a driving connection from shaft 10 and when so connected shaft 23 of said detachable special gear connection may be driven at the will of the operator or temporarily disconnected effecting through the operation of lever 21 to separate the clutch members 18 and 19.

The special support 12 for the gear driving members may be turned in any position desired to facilitate the adjustment of the operating mechanism in any angular position relative to standard 9.

In constructing the combined machine including the washing machine and operating mechanism it is designed to utilize the speed reducing gearing of the driving parts that are essential to the operation of the washing machine to drive the ironing roller 33 in order to dispense with the usual complication of gearing that attends the operating mechanism of the modern art. To save the expense of gear as noted a direct connection is made between the driving parts associated with the washing machine and operating part of the operating mechanism, comprising knuckles 80 detachably connected with shaft 23 and knuckles 81 fixed to shaft 34. 82 is a connecting shaft provided with knuckles 83.

By means of connection shown which produces a universal and extensible joint, the operating mechanism may be moved up and down without destroying the driving connections.

In utilizing the devices disclosed, the washing machine may be used singly or in conjunction with the operating mechanism as desired. When the washing machine is being used alone, the operating mechanism may be disconnected and the gear frame 12 may be removed and a wringer may be attached and connected for driving relation with shaft 10 in the same manner that the driving connections are established for driving the gear members carried in gear frame 12.

If it is desired to drive the operating mechanism with the washing machine, the connection is made as hereinbefore described and as shown in the drawing.

We have shown herein one form of embodiment of our invention. However, detailed parts and detailed combinations may be varied to meet the requirements of best usage without departing from the spirit of the invention which is directed broadly to the economical association by proper gear members of a washing machine and an ironing machine.

What we claim is:

1. In a device of the class described, in combination, a support, a vertical standard thereon, a driven shaft within the vertical support, provided with a sleeve fixed thereto and fashioned to engage a driven member detachably engageable therewith, means for driving the driven shaft, an operating mechanism adjacent the support, a frame detachably supported upon the vertical standard, and a gear mechanism thereon comprising a vertical stud or shaft fashioned at its lower end to engage the sleeve of the driven shaft, a gear wheel loose thereon provided with a clutch face, a clutch member splined on the vertical shaft, means for shifting the clutch member to and from engagement with the gear wheel, a horizontal shaft journaled in the frame and a gear wheel on the horizontal shaft driven from the gear on the vertical shaft and a shaft connecting the horizontal shaft in the detachable gear frame, with the operating mechanism to drive the latter.

2. In the device of the class described, in combination, a support, a vertical standard thereon, a driven shaft therein, provided with a clutch member at its upper end, means for driving said shaft, a frame supported upon the vertical standard, a gear mechanism therein comprising a vertically disposed drivable member engageable with the posed drivable member engageable with the drive shaft in the vertical standard, a gear normally loose on said member provided with a clutch face, a clutch member splined on the drivable member, means for shifting the clutch member into engagement with said gear wheel, a horizontal shaft journaled in said frame and a gear wheel thereon driven from the gear wheel on the drivable member, an operating mechanism and means for connecting the gear mechanism in the gear frame with the operating mechanism that will permit relative movement of the operating mechanism and the frame support for the vertical standard.

3. In a device of the class described, in combination, a support, a vertical standard thereon, a driven shaft therein, provided with a clutch member at its upper end, a gear frame detachably supportable upon the vertical standard, a gear mechanism therein, comprising a vertical shaft fashioned or provided with means to detachably engage the clutch member on the driven shaft, a loose gear on the vertical shaft, a horizontal shaft journaled in said frame, a gear wheel fixed thereto and driven from the gear wheel on the vertical shaft and means for establishing or interrupting driving relation between the vertical shaft and the loose gear thereon, an operating mechanism and means for connecting the operating mechanism in a detachable relation with the horizontal shaft of the gear frame said connecting means being of a flexible nature that will permit movement of the frame support for the vertical standard and the operating mechanism relatively.

4. In a device of the class described, in combination, a supporting member, a driving mechanism on the supporting member, a gear frame and gear mechanism therein detachably connectible with the supporting member in a relation that when connected the gear mechanism thereof will be driven from the driving mechanism in the supporting member, an operating mechanism and means connecting the gear mechanism in the gear frame with the operating mechanism in a manner that will permit the operating mechanism to be moved about the gear frame into different positions without changing the position of such gear frame.

5. In a device of the class described, in combination, a supporting member, a driving mechanism on the supporting member, a gear frame and gear mechanism therein detachably connectible with the supporting frame in a relation that when connected the gear mechanism thereof will be driven from the driving mechanism in the supporting member, an operating mechanism and means for detachably connecting the gear mechanism in the gear frame with the operating mechanism, comprising parts flexibly related to permit relative movement when such driving connection is established of the supporting frame and operating mechanism about each other without changing the position of the gear frame relative to its driving connection with the driving mechanism of the supporting frame.

6. In a device of the class described, in combination, an operating mechanism, a supporting frame, driving mechanism on the frame, a detachable transmission mechanism adapted to receive power from the driving mechanism and a member connecting the transmission mechanism and the operating mechanism in a detachable relation, including parts flexibly related to facilitate relative adjustment of the operating mechanism and the supporting frame about each other without changing the position of the gear frame relative to its driving connection with the driving mechanism of the supporting frame.

In testimony whereof we affix our signatures in presence of two witnesses.

SIMON E. SCHROEDER.
CHAS. W. BIRD.

Witnesses:
ROSE FELTNER,
W. V. TEFFT.